Patented Dec. 22, 1931

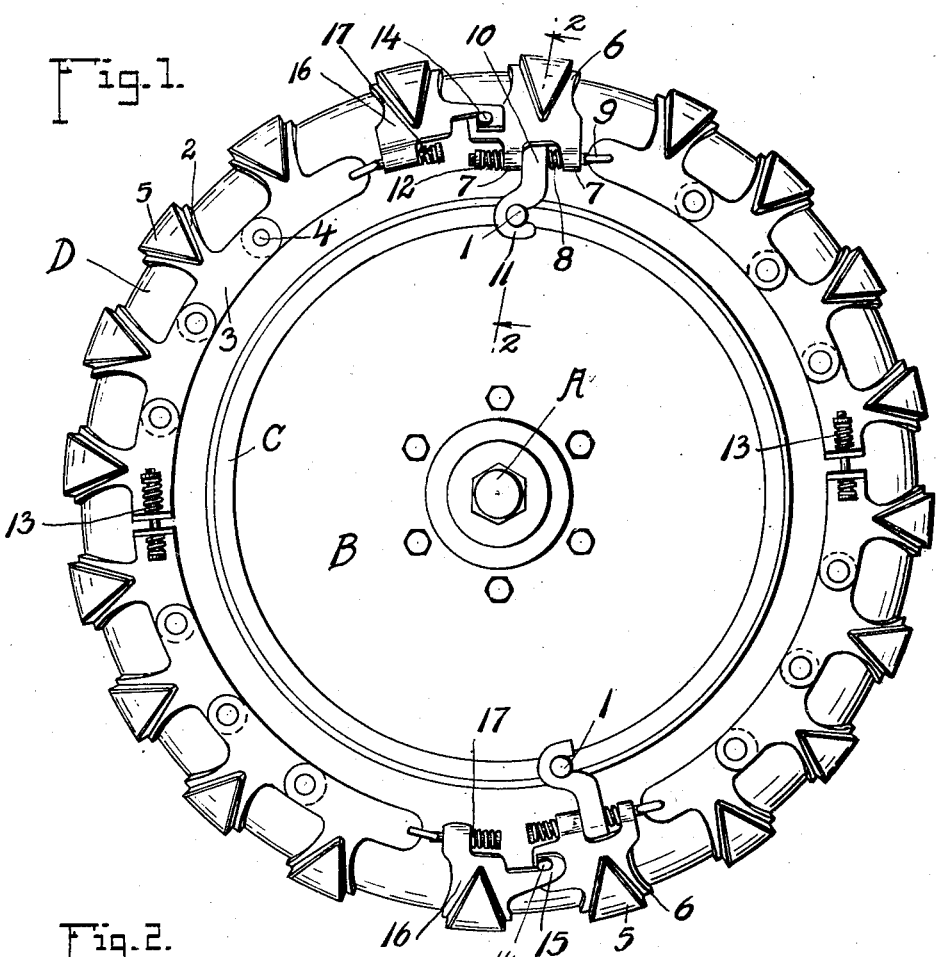
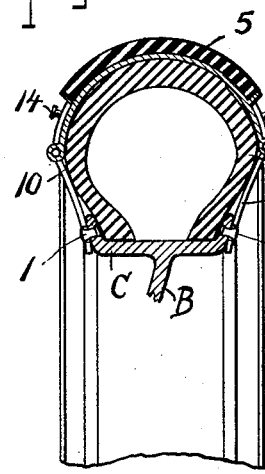
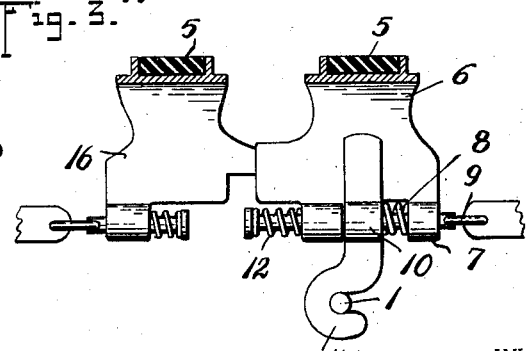
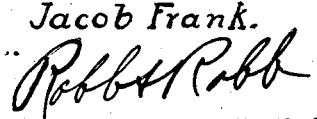

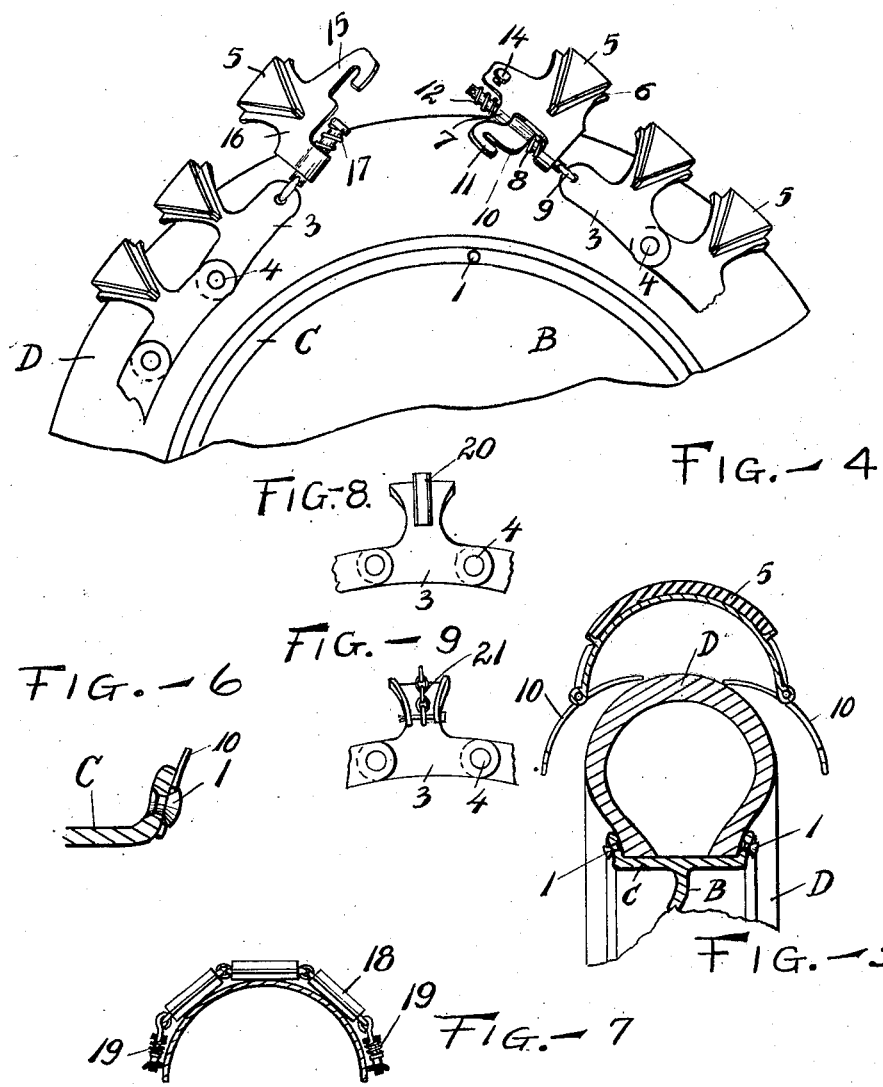

1,837,708

UNITED STATES PATENT OFFICE

JACOB FRANK, OF CLEVELAND, OHIO

EXTRICATING AND NONSKID DEVICE FOR VEHICLE WHEELS

Application filed June 25, 1928. Serial No. 287,923.

This invention is directed to the art of anti-skid devices for wheels and an object in view is the provision of an anti-skid device which may be readily applied to a wheel without necessitating lifting or raising of the latter from the ground. Such a device as is provided by this invention constitutes in effect an extricating mechanism for pulling vehicles out of mire or any mud hole or other similar conditions of grief such as a snow drift. Now known types of devices of this character are not susceptible of being applied to wheels under extremely unfavorable conditions as above noted, and this invention provides a device capable of being attached to a wheel more than likely only in part so that it may pull itself out of a hole under its own power.

It is a further object of the invention to provide an anti-skid device of this type which includes means for positively affixing the same to the rim of a wheel and in this connection a detailed feature of no little importance lies in the mode of attachment of the anti-skid device to the rim. I avail myself of projections which are formed on the rim in any suitable manner and properly spaced and which constitute a gripping or an anchorage means for the fastening means carried by the anti-skid device, which in a preferred embodiment takes the form of hooked arms which engage with the side portions of a rim and hold the anti-skid device positively in place by hooking on to the projections aforesaid.

To the end of allowing for a certain amount of play or slippage between the non-skid devices and the wheel and still have the two joined together in a positive manner, the connecting means includes yieldable elements which permit of a slight relative movement between the anti-skid device as applied and the wheel.

When the yieldable means set out in the previous paragraph, takes the form of springs, the latter elements also function to maintain taut and yet flexible the anti-skid devices on the tire. Furthermore, they constantly maintain the hooked arms in proper engagement with the projections.

A feature of this invention of paramount importance is the provision of an anti-skid device which may include any one of several types of anti-skid tread elements. It is readily appreciable that various types of vehicles and various conditions of service dictate different constructions in the tread elements that actually engage the surface on which the vehicle operates, and it is an object of this invention to provide an anti-skid device which is readily adapted to include any of a variety of treads. In this connection, I might mention that various modifications of the device might include such elements as the so called diamond tread, chain tread members, spring mounted link treads, rubber, or kindred composition tread members, or in fact any desired members for the purpose specified.

It is a still further object of the invention to dispense with the almost universal chain construction availed of in anti-skid devices of this character and employ in lieu thereof a device made up of substantial pieces of metal but which are joined together by rivets so as to provide a flexible and easily handled unit. The advantages of such a construction are many. I might call attention to the fact that such a device is much more readily applied to a tire and fits very snugly thereon; furthermore, the type of attaching means I prefer to employ is particularly suited to such a construction. In addition, harmful wear on the tire is obviated.

Going into my novel anti-skid device a little more in detail, I employ curved or arched members including side pieces and which members are joined together at each side by rivets. They carry at their arcuate portions a desired type of tread element.

The device is made up in two units, each unit comprising series of these curved members linked together. One of the units comprises a substantial semi-circumference and carries at each end means for attaching the device to the wheel and also suitable instrumentalities for having the other unit making up the whole device attached thereto. This particular making up of the device or its attaching means has particular advantages in the ease in which it may be applied to a time.

With these and other objects and advantages in view as will in part become apparent and in part be hereinafter stated, the invention comprises certain novel constructions, combinations and arrangements of parts as will be subsequently specified and claimed.

For a full and more complete understanding of the invention, reference may be had to the following description and accompanying drawings, in which—

Figure 1 is a view in side elevation of one modification of my novel non-skid device as applied to the wheel, bringing out particularly the method by which it is attached thereto.

Figure 2 is a sectional view taken about on the line 2—2 of Figure 1 and

Figure 3 is a detail view partly in section and partly in elevation bringing out the particular resilient means provided for accommodating the slight amount of slippage between the tire and anti-skid device.

Figure 4 is a view somewhat fragmentary from the side bringing out the manner of application of the device to the tire.

Figure 5 is a sectional view similar to Figure 4 in that it shows the device in the process of being applied.

Figure 6 is an enlarged detail showing partly in section and partly in elevation the attaching means associated with the rim of the wheel.

Figure 7 is an illustration of one form of tread element which may be employed with my invention.

Figure 8 shows another modification of a tread element.

Figure 9 brings out the manner in which the chain type tread might be employed, while Figure 10 is a detail showing of one of the diamond tread constructions.

While a preferred specific embodiment of the invention is herein set forth, it is to be understood that I am not to be limited to the exact construction illustrated and described because various modifications of these details may be provided in putting the invention into practice within the purview of the appended claims.

An automobile wheel of well known type is shown in Figure 1 and comprises generally a hub A, disc B, and rim C on which is mounted a rubber tire D which may be of any well known type. It is readily appreciable that the particular construction of the wheel and tire does not enter into my invention inasmuch as my novel device may be applied to any type of wheel. The rim C is provided with a form of headed pin 1 such as is clearly brought out in Figure 6. Preferably this member comprises a hollow rivet member which has its ends flared to provide the attachment to the rim and also the desired head.

The non-skid device is made up of two sections or units that are identical in construction with the exception of certain attaching instrumentalities, the detailed construction of which will be hereinafter more fully set out. These sections are made up of sheet metal members 2 of arcuate configuration that terminate in side pieces 3, which pieces are pivotally joined together as indicated at 4 thereby imparting flexibility to the section. The arcuate portion of the members 2 is provided with some desirable type of tread element as brought out in Figure 1 by the diamond tread 5.

One of the sections is provided at each end with an arcuate member of different construction from the remainder and which member is designated by the reference character 6. These last named parts carry tread elements 5 which are identical with the remainder of those carried by the other arcuate members. However, in lieu of the side pieces 3 there are depending lugs 7 which are provided with bores and carry a pivot pin 8 that at one end is connected with the side pieces of the adjacent member 2 by link construction shown at 9. A latch member 10 having at one end a hook 11 is carried by the pivot pin 8 and is adapted to have the hook 11 engage with one of the projections 1 provided on the rim C. Attention is directed to Figure 5 in which the particular arrangement of the member 10 with the remainder of the anti-skid device in the tire is brought out. When the device is applied the member 10 which is curved to conform with the curvature of the tire, lies snugly thereagainst and has a portion interposed between the member 6 and the tire thereby providing a connection which has features of the utmost rigidity.

For the purpose of providing a certain amount of play between the non-skid treads and the tire, looseness in the connection is made manifest by providing coil springs 12 which are interposed between the latch 10 and one of the lugs 7 and also between the other lug 7 and the headed end of the pin 8. In a preferred form these springs are coiled around the pin 8. To this same end each of the sections is provided intermediate its ends with a loose joint of similar spring and pin construction as shown at 13, this joint taking the place of the pivotal connection 4 which would otherwise occur at that point.

Each of the members 6 is provided with a pin 14 which is adapted to be engaged by a hook element 15 carried by arcuate members 16 which constitute the end elements of the other section. These members 16 are connected with the adjacent arcuate members 2 by a loose joint comprising the link pin and spring construction shown at 17.

In the present instance I have shown the diamond tread as the preferred type of nonskid tread element which may be employed. However, I now call attention to Figures 7, 8 and 9 in which modifications of the tread element are exemplified. In Figure 7 I have shown a series of bar members 18 which are linked together and connected to the arcuate member by a spring connection shown at 19. This type of tread element is particularly desirable under such conditions as service involving very large and heavy vehicles. Figure 8 shows a type of tread element comprising a groove defined by flanges 20, which is filled with rubber or similar composition This type of tread is particularly harmless to any road surface on which the vehicle may operate. In Figure 9 I have shown the manner in which a conventional chain tread 21 may be availed of.

In applying the non-skid device to the wheel, the member in which the latch members 10 are included, is first applied in a manner clearly shown in Figure 5, the springs 8 allowing for the ready attachment of the hook members 11 over the projection 1. The other section may then be applied and is securely fastened by the hook and pin arrangement 14 and 15. It is readily appreciable that the foregoing manner of application of the device renders it particularly susceptible to use with wheels which are partially in mire or in other unfavorable circumstances.

The preferred embodiment of tread element has taken the form of the so called diamond tread which may include a flange construction in which is embedded or inlaid a filler of rubber or similar composition suitable to any particular wear receiving conditions. This type of tread construction has particular advantages in that it renders silent the operation of a vehicle wheel to which this device has been applied and furthermore, obviates any harmful wear on the road, and in addition I might note that it further enhances the smoothness of movement of the vehicle along a surface.

Figure 4 shows how the hook 11 when depressed, is engageable about the pin 1. It is necessary, not only to depress the member 6 and hook 11, but to press the hook 11 to the left against the spring 12 until said hook is in receiving position relative to the pin 1 whereupon the grip on the hook is released, allowing the same to be snapped by the spring 12 over the pin 1 to the position shown in Figure 1. The tire engaging the outer end of latch 10 and the headed portion of the pin 1 positively prevent the hook 11 from removal laterally from the pin 1, and spring 12 prevents the hook from slipping tangentially along rim C.

The spring between the latch 10 and the member 7 serves to hold the latch by friction in any desired position on the pivot pin 8. This is an advantageous feature, as is evident upon inspection of Figure 5. The latches 10 are set as shown and held thus by said spring (not shown in Figure 5) while the device is being applied to the tire. As said device is lowered, the tire D forces the outer parts of latches 10 to move away from each other and the hook portions toward each other and against the sides of the rim C. This construction therefore avoids the necessity of holding said outer parts by the person applying the same. He need merely position the parts as shown in Figure 5 and then move the element 5 toward the tire D in order to position the hooks where they may be applied to the pins 1.

Having thus described my invention, what I claim as new and desire to secure by Letters Patent of the United States, is:—

1. A device of the class described, comprising, in combination, a member in a plurality of sections, shafts carried by one of the sections, the member being adapted to engage the tread portion of the wheel, projections on the wheel in the form of integral outstanding lugs, hooked arms carried by the shafts for engaging said projections whereby the first named member is positively held in position on the wheel, and means for holding the hooked arms in operative position.

2. A device of the class described, comprising, in combination, a two-section member adapted to engage the tread portion of the wheel, one of the sections carrying a shaft at each end, projections on the wheel, hooked arms resiliently connected to the shaft for engaging said projections whereby the said member is positively held in position on the wheel.

3. A device of the class described, comprising, in combination, non-skid tread elements in two sections, shafts carried by each end of one of the sections, hooked arms carried by the shafts, and coil springs holding the hooked arms in operative position.

4. A non-skid device of the class described, comprising, in combination, pivotally connected carrier members and tread members, said tread members including spaced road-penetrating ridge-like projections adapted to cut into the surface passed over and a resilient filling material between said spaced projections.

5. In a device of the class described, an element adapted to engage the tread of a tire, a wheel having a tire on which said element is mounted, said wheel having lugs and said element having pivoted hooks adapted to receive said lugs for attaching purposes, and instrumentalities associated with said element and engageable by said tire to hold said hooks in lug receiving position.

6. In a device of the class described, a non-skid attachment for a tire, a wheel to which said attachment is adapted to be secured, hook elements pivotally movable in a plane transverse to the wheel, said wheel having lugs adapted to be received by said hooks, said hooks having extensions projecting intermediate the tire and said attachment and means yieldingly maintaining said hooks against accidental movement, whereby when said attachment is applied to a tire, said tire forces said extensions to pivot toward said attachment, whereby the hooks are moved toward the sides of said wheel for engagement with said lugs.

7. In a non-skid attachment of the class described, a wheel having a lug, a plurality of non-skid sections on the wheel, means for securing one of said sections to the wheel, said means comprising a hook engageable over said lug, means cooperating with said hook for maintaining the same in engagement with said lug, means for connecting said sections together, one of said sections having a lug and the other having a hook engageable over said lug, and means for maintaining said hook in engagement with said lug.

8. In a non-skid attachment of the class described, a wheel having a lug, a plurality of non-skid sections on the wheel, means for securing one of said sections to the wheel, said means comprising a hook engageable over said lug, means cooperating with said hook for maintaining the same in engagement with said lug, means for connecting said sections together, one of said sections having a lug and the other having a hook engageable over said lug, the means for maintaining the first hook in place serving also to maintain the second hook in place.

9. In a non-skid attachment of the class described, a wheel having a pair of spaced lugs, a non-skid section mounted on the wheel and having hooks in facing relation, said hooks engaging over said lugs, said section consisting of a plurality of parts, and means providing for relative movement of said parts and including resilient means for maintaining them together, said means serving also to maintain said hooks on said lugs.

10. In a non-skid attachment of the class described, a wheel, a pair of sections mounted on said wheel, one of said sections having lugs and the other having hooks receiving said lugs, each of said sections consisting of links held together by resilient means, said resilient means serving also to maintain said hooks on said lugs, and said sections on said wheel.

11. A device of the character described, comprising the combination with a tire rim, of a plurality of non-skid treads adapted to be secured to the rim, the treads having a surface conforming in configuration with that of a tire on the rim and comprising a hollow base member of flexible metal and a body of rubber embedded in the metal base and forming a flush resilient cushioning tread surface therewith, the metal base member being adapted to cut into a road surface being passed over as the rubber tread is compressed by weight of the load thereon, the metal base thereby acting as an antiskid portion of the tread.

12. A device of the character described, comprising the combination with a tire rim, of a plurality of non-skid treads adapted to be secured to the rim, each tread being composed of a road-penetrating hollow metallic base having tread surface inlaid therein, the tread surface being formed of a rubber sheet embedded in the metallic base and flush therewith to cushion the tread, while permitting the base to cut into a road surface being passed over to inhibit skidding.

In testimony whereof I affix my signature.
JACOB FRANK.